United States Patent [19]
Ritter, Jr.

[11] 3,951,481
[45] Apr. 20, 1976

[54] PLANETARY REACTION HUB AND BEARING RETAINER

[75] Inventor: Arthur J. Ritter, Jr., Metamora, Ill.

[73] Assignee: Caterpillar Tractor Co., Peoria, Ill.

[22] Filed: Apr. 18, 1975

[21] Appl. No.: 569,382

[52] U.S. Cl. ............................................. 308/187
[51] Int. Cl.² ...................... F16C 1/24; F16C 33/78
[58] Field of Search ...................... 308/16, 92, 187

[56] References Cited
UNITED STATES PATENTS

| | | | |
|---|---|---|---|
| 2,666,676 | 1/1954 | Rhine | 308/187 |
| 3,021,182 | 2/1962 | Schnacke | 308/187 |
| 3,177,041 | 4/1965 | Isenbarger | 308/187.1 |
| 3,316,022 | 4/1967 | Isenbarger | 308/187 |
| 3,460,874 | 8/1969 | Johnson | 308/187 |

*Primary Examiner*—Lloyd L. King
*Attorney, Agent, or Firm*—Phillips, Moore, Weissenberger, Lempio & Strabala

[57] ABSTRACT

An outboard planetary final drive unit for a tractor or truck has a pre-loading arrangement for pre-loading the bearings of the final drive unit. The final drive unit includes a sprocket or wheel on a drive shaft supported by bearings in a support housing. Means for pre-loading the bearings in the form of a plurality of pins of specified length are provided which extend through bores in and on opposite sides of a reaction hub of a planetary sprocket drive where a retaining ring for the reaction hub abuts and bears against the plurality of pins which act to pre-load the bearings.

9 Claims, 3 Drawing Figures

PLANETARY REACTION HUB AND BEARING RETAINER

BACKGROUND OF THE INVENTION

This invention relates to tractors and trucks particularly to the drive mechanism therefor. More particularly, this invention relates to an improved arrangement for pre-loading the bearings of the final drive or sprocket found in such final drive mechanisms. While the following discussion refers to the application of the invention to drive mechanisms for tractors and trucks, it is to be understood that such is merely for the sake of convenience. The invention has broad application as a mechanism for pre-loading bearings.

Tractors extensively used in the earthmoving industry typically include right and left final drives for transmitting power from the engine to the right and left track assemblies or wheels. Each final drive includes a drive sprocket or wheel journalled to a cross-shaft. The shafts are supported by bearings which include an arrangement or means for pre-loading the bearings supporting each shaft in the assembly which supports each shaft and sprocket with respect to its support housing. Also included is a retaining ring which abuts a reaction hub, which in turn bears on a bearing.

Previously, the bearings, which were spaced by a sleeve, were pre-loaded by means of securing the retaining ring for the reaction hub directly to its respective bearing. In order to provide the proper pre-load to the bearing with the prior art arrangement, the length of the sleeve between the bearing as well as the width of the reaction hub are two critical dimensions which must be accurately set. This, of course, presents a problem in manufacture, etc., and the additional costs incident thereto.

In addition, the reaction hub is splined to a large support hub for the final drive which allows a limited degree of torsional rotation caused by the change of rotational direction, e.g., shifting from forward to reverse, because of manufacturing tolerances incident to production of such structures. The relative torsional rotational movement is produced as power is introduced to the drive shaft for the planetary. As power is cycled during forward to reverse operation, bending stresses are built up in the plurality of bolts on a bolt ring which serve to retain the reaction hub, which often causes premature failure of the parts. This cycling also produces another deleterious effect in the form of galling of the metal of the reaction hub and bearings at their contact surface. It is to be a solution of these and other problems that this invention is directed.

SUMMARY AND OBJECTS OF THE INVENTION

It is therefore the primary object of this invention to provide an improved means for pre-loading bearings.

It is a further object to provide such a means for retaining the reaction hub in the limited space of the final drive.

It is a still further object to provide such a means which minimizes the shearing and galling associated with relative torsional rotation imparted when power is introduced.

The invention consists of a means for pre-loading the bearings of a tractor planetary final drive unit. The pre-loading arrangement comprises a plurality of elongated pins fitted within axially directed bores in and extending on opposite sides of a reacton hub of a double planetary sprocket drive. The pins are set to a proper length so that when the retaining ring for the reaction hub abuts and bears against the plurality of pins, the pre-load force is imparted in the bearings.

DETAILED DESCRIPTION

Figure 1:
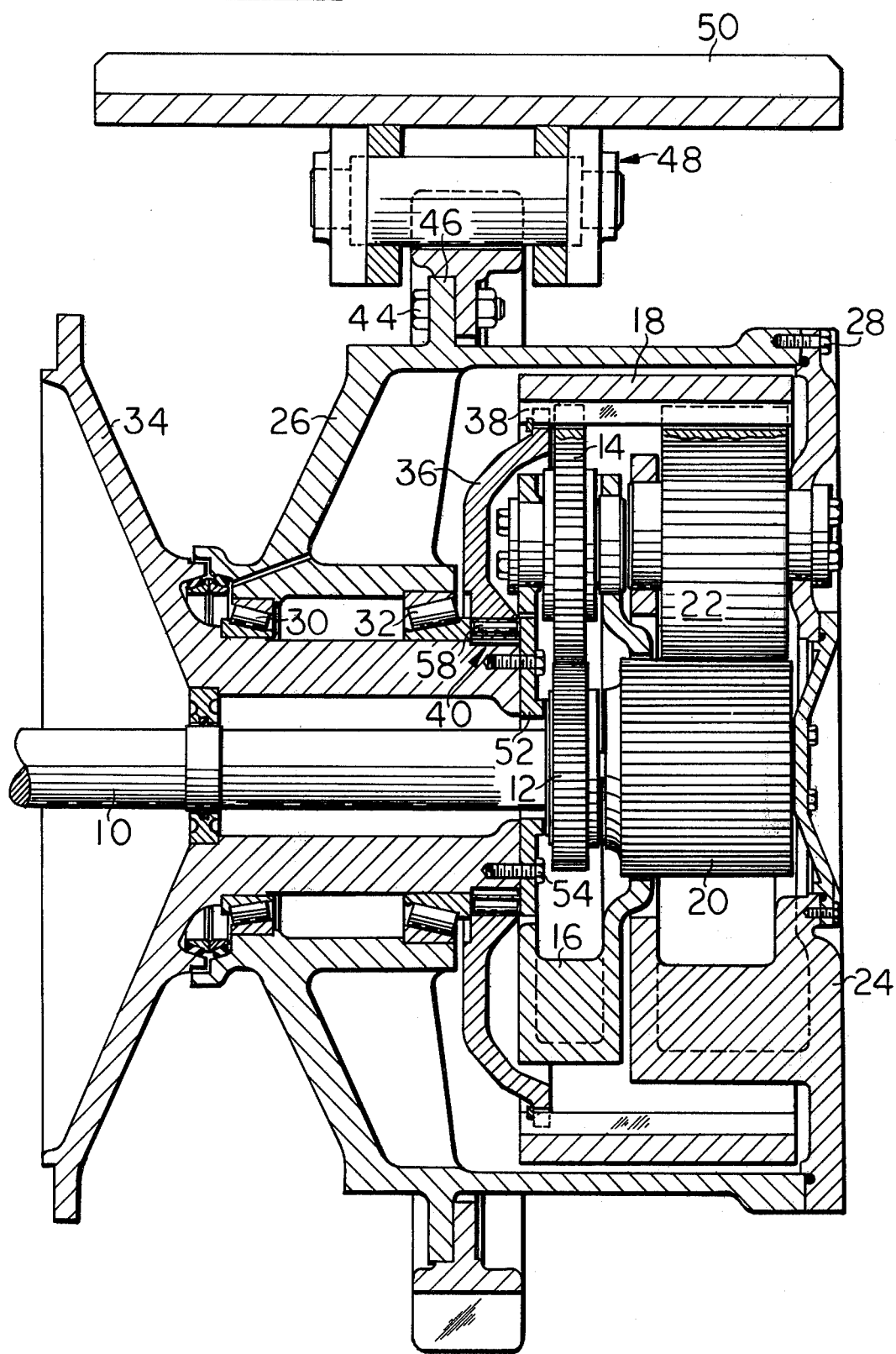
FIG. 1 is a view partially in cross-section of a single final drive embodying the present invention.

Turning to FIG. 1, there is shown a single final drive unit wherein power from an engine (not shown) is transmitted through a shaft 10 from a drive mechanism including transmission, steering clutches, and brakes, etc. (also not shown). Power from shaft 10 enters a double planetary drive train including a first sun gear 12 fixed on the end of the shaft. Sun gear 12, in turn, drives a plurality of first planet gears one of which is shown at 14. The first planet gears are supported by a first planet carrier 16 so that the first planets 14 are also in mesh with a circumscribing ring gear 18. First planet carrier 16 is, in turn, in mesh with a second sun gear 20. The second sun gear 20, in turn, drives a plurality of second planet gears, one of which is shown at 22. The second planet gears are, in turn, supported by a second planet carrier 24. Second planet gears 22 are also in mesh with ring gear 18.

Second planet carrier 24 is secured to a housing 26 by means of a plurality of bolts, one of which is shown at 28. Housing 26 is rotatably supported by means of bearings 30 and 32 on a first hub 34. First hub 34 is, in turn, secured to the vehicle main frame (not shown) by bolt means (not shown).

A second hub 36 is provided within housing 26 for the purpose of preventing rotation of ring gear 18. This is done by having the outer diameter portion of the second hub in mesh with the internal gear teeth 38 of ring gear 18 and the inner diameter portion thereof splined as generally shown at 40 to first hub 34, as will be hereinafter more fully described.

On the outer periphery of housing 26, a drive sprocket 42 is there secured by a plurality of bolts, one of which is shown at 44. The bolts secure the drive sprocket 42 to a radially projecting annular flange 46 of housing 26. The drive sprocket meshes with the conventional track links, one of which is shown at 48, which are secured to and form a part of an endless articulated track having shoes, one of which is shown at 50. In overall operation, rotation of shaft 10 rotates housing 26 and thereby drive sprocket 42 through the above-described double planetary drive train.

Figure 2:
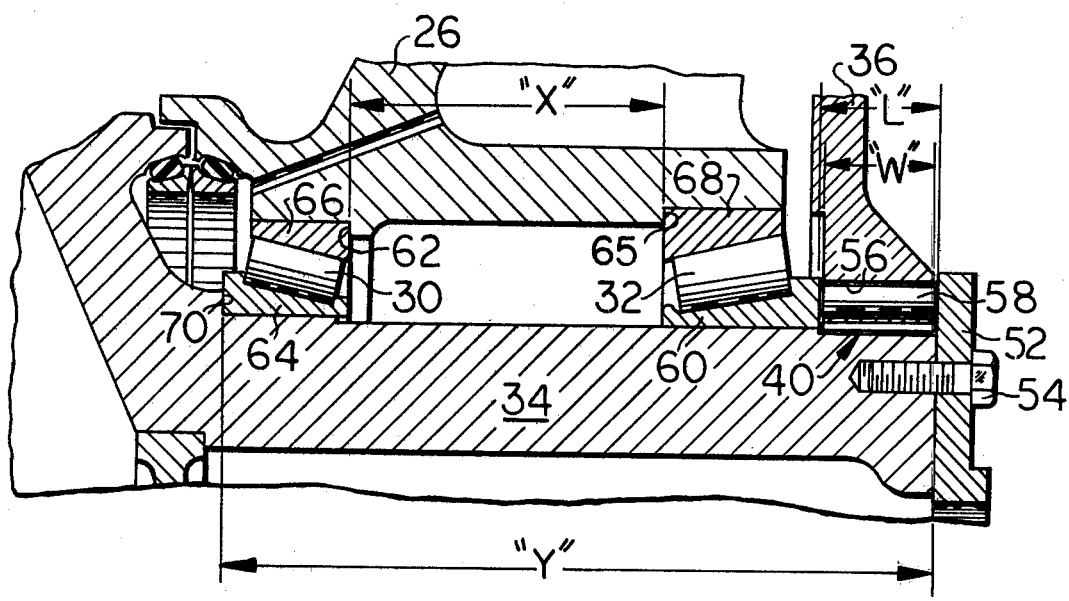
FIG. 2 is an enlarged cross-sectional view of the instant invention bearing pre-load arrangement or means; and, FIG. 3 is a plan view of the reaction hub retainer ring showing by means of broken lines the relative location of the pins for pre-loading the bearings.
Figure 3:
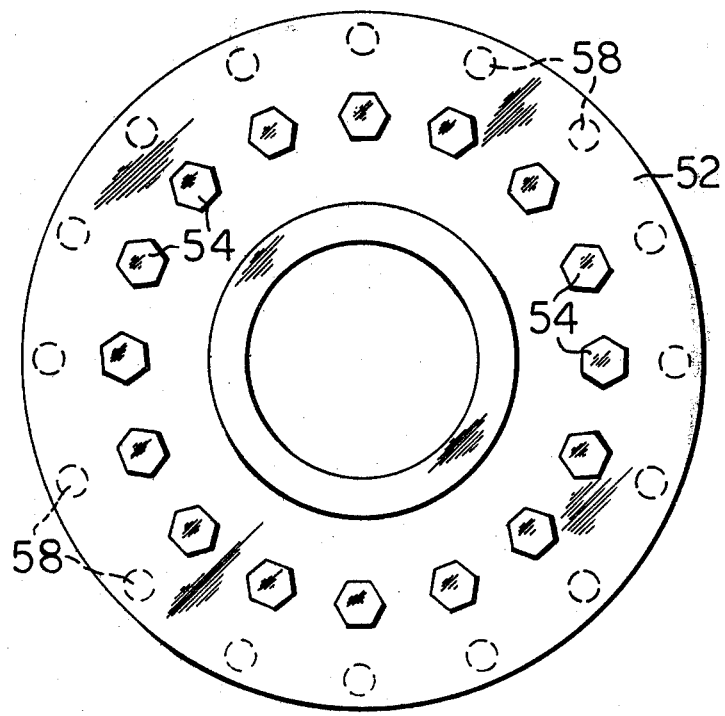

As best seen in FIG. 2, second hub 36 is retained on spline 40 which is intermediate the second hub and first hub 34 by means of a ring 52. Ring 52 is secured to the end of hub 34 by a plurality of bolts 54 as best seen in FIG. 3. As seen in FIGS. 2 and 3, the second or reaction hub 36 has a plurality of axially oriented holes or bores 56 therein. Inserted within the bores are a plurality of pins 58. In the arrangement shown sixteen pins are fitted within 16 corresponding bores, equally spaced around a hole circle. The pins are of a length sufficient to extend beyond their bores on opposite sides of the reaction hub.

Pre-loading is accomplished by securing ring 52 on hub 34 by means of bolts 54. Ring 52 forces pins 58 against inner race 60 of bearing 32 with the force being transmitted through the bearing by housing 26. This results in the force being transmitted to bearing 30 and thereby pre-loading both bearings.

The desired pre-load force is achieved by setting and maintaining the proper length of pins 58.

In particular, the distance X between shoulders 62,65 of the outer races 66,68 of bearings 30,32 and the distance Y between the outer end of the hub 34 and the shoulder 70 on hub 34 for the inner race 64 of bearing 30 is closely toleranced to ensure proper pre-load on both bearings imparted by pins 58 of controlled length L. The width W of the reaction hub through which pins 58 pass slightly less than the length L of the pins which permits a slight radial movement of the hub within the tolerance of the spline connection 40. In addition, the pins are of slightly smaller diameter than the diameter of the holes 56 which prevents transfer of torque between the pins and the hub within the tolerance of the splined connection as the hub moves radially.

It is to be understood that the foregoing description is merely illustrative of the preferred embodiments of the invention and that the scope of the invention is not to be limited thereto, but is to be determined by the scope of the appended claims.

What is claimed is:

1. In a mechanism including a power shaft transmitting power to a gear set, said gear set comprising a sun gear fixed to said shaft, a first hub on said shaft and a housing rotatably mounted on said first hub by a plurality of bearings, a reaction hub having its radially innermost portion connected to said first hub by spline means, said reaction hub being intermediate said bearings and a ring mounted on said first hub, said reaction hub being spaced from said bearings and said ring, and means associated with said reaction hub for pre-loading said bearings.

2. The invention of claim 1 wherein said means for pre-loading said bearings comprises a plurality of holes in said reaction hub intermediate said bearings and said ring, and a pin within each of said holes, each said pin being generally elongated and of a length to extend through said holes on opposite sides of said reaction hub and contact one of said bearings and said ring.

3. The invention of claim 2 wherein said ring is mounted on said hub by means of a plurality of bolts which serve to force said pins against one of said bearings, so as to provide the desired pre-load force.

4. The invention of claim 3 wherein the number of pins is sixteen, equally spaced around a corresponding number of holes in a hole circle.

5. The invention of claim 4 wherein said ring defines an axis co-axial with said shaft and each of said holes is axially oriented.

6. The invention of claim 3 wherein the number of said bearings is two and each defines an inner and an outer race, and wherein the inner race of said first bearing abuts a shoulder on said hub, and wherein the outer races of said bearings each abut respective shoulder on said housing.

7. The invention of claim 2 wherein said pins are of slightly smaller diameter than said holes whereby torque transfer is effectively between said hub and said reaction hub through said spline means and not through said pins.

8. The invention of claim 1 wherein said gear set is a planetary set further comprising a ring gear and a plurality of first planet gears mounted on a first planet carrier, and wherein the radially outermost portion of said reaction hub is in mesh with said ring gear.

9. The invention of claim 8 wherein said planetary set further comprises a second sun gear and a plurality of second planet gears mounted on a second planet carrier.

* * * * *